United States Patent [19]

Nakamura et al.

[11] Patent Number: 5,627,926
[45] Date of Patent: May 6, 1997

[54] PRISM PLATE FOR EFFICIENTLY EMITTING LIGHT FLUX WITHIN A PREDETERMINED RANGE, AND LIQUID CRYSTAL INDICATOR AND INDICATOR ILLUMINATION METHOD USING THE SAME

[75] Inventors: Shigeru Nakamura, Tachikawa; Akira Arimoto, Kodaira; Kenkichi Suzuki; Katsuhiko Shibata, both of Mobara, all of Japan

[73] Assignee: Hitachi, Ltd., Japan

[21] Appl. No.: 533,547

[22] Filed: Sep. 25, 1995

Related U.S. Application Data

[62] Division of Ser. No. 117,789, Sep. 8, 1993, Pat. No. 5,467,417.

[30] Foreign Application Priority Data

Sep. 16, 1992 [JP] Japan ................................. 4-246178

[51] Int. Cl.$^6$ .................................. G02B 6/34; F21V 9/04
[52] U.S. Cl. ........................... 385/36; 385/37; 385/147; 385/901; 362/26; 362/31; 362/32; 362/302; 362/309; 359/834; 349/62; 349/112; 349/113
[58] Field of Search ................................ 385/901, 902, 385/146, 147, 133, 31, 36, 37; 362/31, 32, 26, 27, 302, 309; 359/48, 49, 42, 50, 40, 69, 70, 834

[56] References Cited

U.S. PATENT DOCUMENTS

| | | |
|---|---|---|
| 5,050,946 | 9/1991 | Hathaway et al. ...................... 385/33 |
| 5,211,463 | 5/1993 | Kalmanash ............................. 362/26 |
| 5,237,641 | 8/1993 | Jacobson et al. ..................... 385/146 |
| 5,303,322 | 4/1994 | Winston et al. ...................... 385/146 |
| 5,339,382 | 8/1994 | Whitehead ............................ 385/146 |
| 5,353,133 | 10/1994 | Bernkopf ............................. 359/41 |
| 5,359,691 | 10/1994 | Tai et al. ........................... 385/146 |
| 5,467,417 | 11/1995 | Nakamura et al. ..................... 385/36 |
| 5,479,275 | 12/1995 | Abileah .............................. 359/48 |

*Primary Examiner*—Brian Healy
*Attorney, Agent, or Firm*—Evenson, McKeown, Edwards & Lenahan, P.L.L.C.

[57] ABSTRACT

An information indicator suitable for information processors such as personal computers, word processors and the like includes a light source, a scattering plate which scatters light from the light source, an indicator plate irradiated with scattered light from the scattering plate, and a prism plate operatively arranged with respect to the scattering plate and the indicator plate and having a prism-like protuberance structure formed at a side thereof. The prism plate is so disposed that the prism-like protuberance structure faces the scattering plate, and the angle $2\theta$ constituting the prism-like protuberance structure is defined by the formula, $2\theta \leq \frac{2}{3} \times (\pi/2 + 2 \times \arcsin(n'/n))$, in this inequality, n is the refractive index of said prism plate medium, and n' is the refractive index of a material in which the prism plate is arranged.

11 Claims, 4 Drawing Sheets

PRISM PLATE FOR EFFICIENTLY EMITTING LIGHT FLUX WITHIN A PREDETERMINED RANGE, AND LIQUID CRYSTAL INDICATOR AND INDICATOR ILLUMINATION METHOD USING THE SAME

This is a divisional of application Ser. No. 08/117,789, filed Sep. 8, 1993, now U.S. Pat. No. 5,467,417.

BACKGROUND AND SUMMARY OF THE INVENTION

The present invention relates to a prism plate which efficiently emits within a predetermined range of angles a flux of light that is incident over a wide range of angles, to an indicator, such as a liquid crystal indicator, incorporating such a prism plate that is used for information indication in information processors such as personal computers, word processors, and the like, and to an indicator illumination method which efficiently emits the flux of light within the predetermined range.

It has been desired to develop portable information processors such as personal computers and word processors, with the growth in an information-oriented society. Performance required for the portable information processors is that they should be small in size, light in weight, and consume a small amount of electric power so that they can be used for a long time on a small capacity power source.

In portable information processors, in particular, the information indicator unit roughly determines the shape of the apparatus and at ways consumes electric power; hence it is desired that such unit have a small thickness and be of a type which consumes only a small amount of electric power.

Such an indicator can be represented by a liquid crystal indicator of back-light type as described in Japanese Patent Laid-Open No. 67016/1992.

Referring to FIGS. 1 and 2 of Japanese Patent Laid-Open No. 67016/1992, the light rays emitted from light sources 23 and 24 and the light rays reflected by reflectors 25 are scattered by a scattering plate 26, pass through optical device 27 such as a prism plate whose light incident side is a flat plane 28 and whose light outgoing side is a prism plane 29, and are incident on a liquid crystal indicator element 12. In an embodiment of Japanese Patent Laid-Open No. 67016/1992, the optical device 27 such as the prism plate is made of a polycarbonate resin or a like resin, and the vertex angle between two planes of each prism on the prism plane 29 is, for example, 90 degrees (a half vertex angle is 45 degrees). The optical device 27 such as the prism plate disposed on the scattering plate 26 can collect light scattered over a wide range of angles by the scattering plate 26 in the normal direction of the optical device 27, increasing the luminance within an effective range of visual angle.

A problem arises, however, with a conventional prism plate made of a polycarbonate resin or a like resin having a vertex angle of about 90 degrees (with a half vertex angle of 45 degrees) as shown in the above-mentioned Japanese patent document.

FIG. 6 is a sectional view illustrating the conventional prism plate on an enlarged scale. Reference numeral 60 denotes a prism plate and 61 denotes a ray of light. A solid line 70 in FIG. 7 represents the visual angle characteristic of outgoing light of the prism plate 60 illustrated in FIG. 6, which characteristic is found by a ray tracing calculation under the condition where the vertex angle 2θ between a prism plane 62 and a prism plane 63 is 90 degrees (a half vertex angle θ=45 degrees) and the refractive index n is 1.585. A dotted line 71 represents the angle dependency of light intensity of the ray of light 61 incident on the prism plate 60 which corresponds to the visual angle characteristic as if there is no prism plate 60. As shown by the solid line 70 in FIG. 7, the luminance is increased by more than 1.4 times over an effective range of visual angle of from −35 degree to 35 degrees. However, the light is also emitted over ineffective ranges of visual angle from −80 degrees to −60 degrees and from 60 degrees to 80 degrees resulting in wasteful consumption of electric power. When viewed from these directions, the indicator is unnecessarily bright. The cause is attributed, as shown in FIG. 6, to the fact that the ray of light 61 incident on the prism plate 60 is totally reflected by the prism plane 62 and is emitted from the prism plane 63.

An object of the present invention is to solve the above-mentioned problems by providing an indicator which prevents light from being emitted into ineffective ranges of visual angle, so as to increase the intensity of light emitted within an effective range of visual angle. It is another object of the present invention to provide an indicator which has a small thickness and consumes a small amount of electric power, thereby being particularly suitable for portable information processors.

In order to achieve the above objects, the basic concept of the present invention is the recognition that the prism plate gathers the light from the scattering plate in the direction of an effective visual angle (for example from −60 degree to +60 degree as shown in FIG. 7), and minimizes intensity of outgoing light in the direction of a noneffective visual angle. And more desirably, the present invention is effective to assure that there is no peak of the intensity of outgoing light in the direction of the noneffective angle.

Another aspect of the present invention is a prism plate having prism-like protuberances formed at a side thereof, in which the vertex angle 2θ formed by two planes of each prism-like protuberance is defined by the formula, $$2\theta > \tfrac{2}{3}(\pi/2 + 2 \times \arcsin(1/n))$$

where n is the refractive index of the prism plate medium.

According to yet another feature of the present invention, an data indicator for an information processor comprises a light source, a scattering plate which scatters light from the light source, an indicator plate irradiated with scattered light from the scattering plate, and a prism plate having many prism-like protuberances formed on one side thereof and being disposed between the scattering plate and the indicator plate such that the prism-like protuberances face the scattering plate, and, the vertical angle 2θ formed by two planes of each of the prism-like protuberances is, $$2\theta > \tfrac{2}{3} \times (\pi/2 + 2 \times \arcsin(n'/n))$$

where n is the refractive index of the prism plate, and n' is the refractive index of the material in which the prism plate is arranged.

Accordingly, in a prism plate whose prism vertex angle 2θ satisfies the above inequalities, the totally reflected scattered light from one surface of the prism-like protuberance is also totally reflected on the other surface of the prism-like protuberance, thereby making it possible to gather the emitted light only in the effective range of visual angle.

BRIEF DESCRIPTION OF THE DRAWINGS

These and other objects, features and advantages of the present invention will become more readily apparent from the following detailed description when taken in conjunction with the accompanying drawing wherein.

DETAILED DESCRIPTION OF THE DRAWINGS

Figure 1:
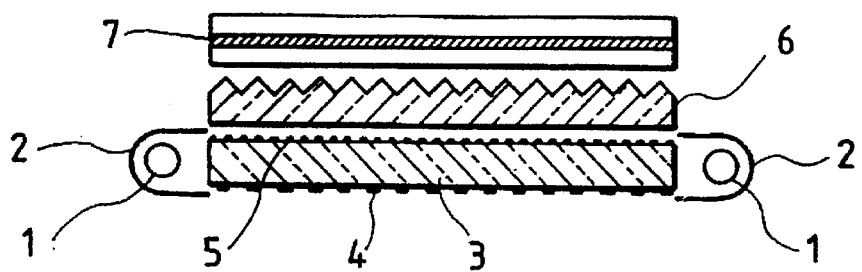
FIG. 1 is a sectional view of a liquid crystal indicator of the side light type in accordance with one embodiment of the present invention.
Figure 2:
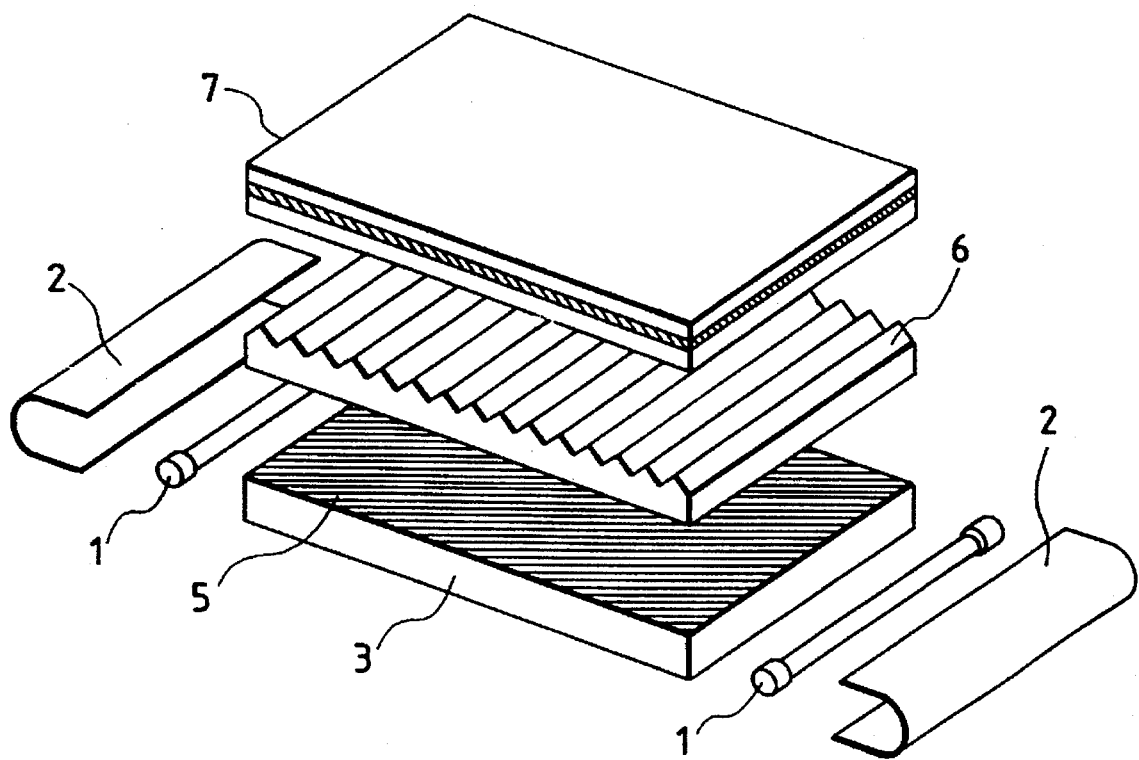
FIG. 2 is an exploded perspective view of the indicator of FIG. 1 showing the liquid crystal indicator of the present invention.

In FIGS. 1 and 2, reference numeral 1 denotes a cold cathode-ray tube, 2 denotes a reflector plate, and 3 denotes a lightguide plate made of an acrylic resin or the like resin and having a reflector 4 such as white paint applied to the lower surface thereof. Reference numeral 5 denotes a thin scattering plate having fine roughness on the surface thereof which is placed on the upper surface of the lightguide plate 3, reference numeral 6 denotes a prism plate whose lower side is flat and which has prism protuberances formed on the upper side thereof, and reference number 7 denotes a liquid crystal indicator element.

Figure 4:
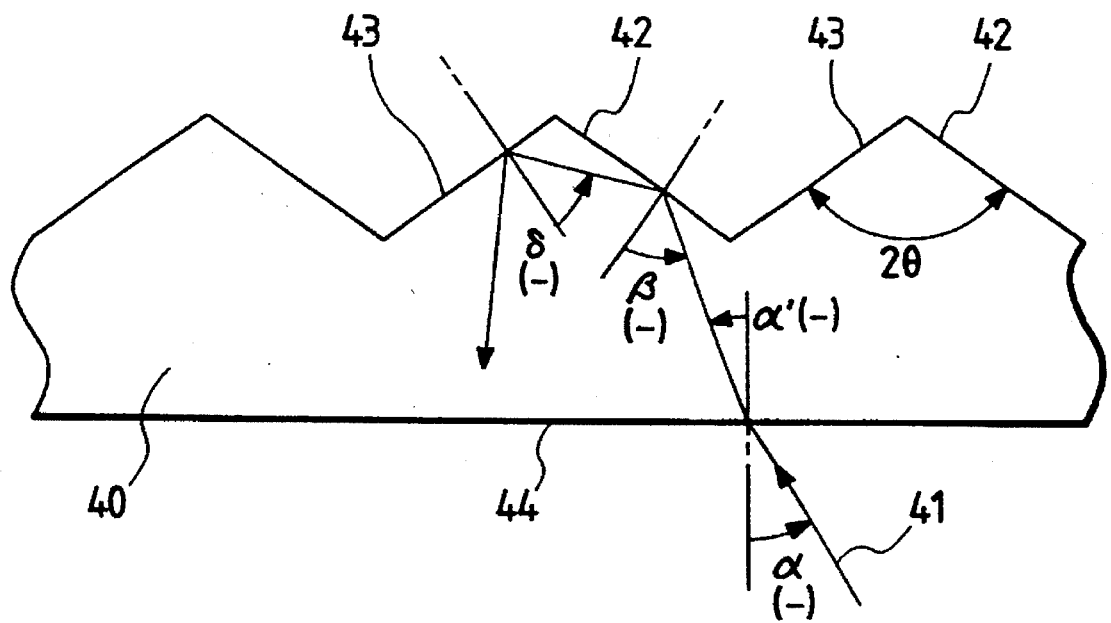
FIG. 4 is a diagram showing a ray trace of the prism plate.

The principle of the present invention will be described with reference to FIG. 4 which is a ray-trace diagram of light of the prism plate. Reference numeral 40 denotes a prism plate having a vertex angle between a prism plane 42 and a prism plane 43 of 2θ (a half vertex angle is θ) and a refractive index of n, and 41 denotes a ray of light having an angle of incidence of α (the direction indicated by arrow in FIG. 4 is assumed to be negative). The angle of refraction α' on a plane 44 (direction indicated by arrow in FIG. 4 is assumed to be negative) and the angle of incidence β on the prism plane 42 (direction indicated by arrow in FIG. 4 is assumed to be negative) are given by:

$$\alpha' = \arcsin(1/n \times \sin\alpha) \ldots \quad (1)$$

$$\beta = \alpha' + \theta - \pi/2 \ldots \quad (2)$$

The ray of light that satisfies the condition of $n \times \sin\beta < -1$ is totally reflected by the prism plane 42 and is incident on the prism plane 43. The angle of incidence δ on the prism plane 43 is given as the following formula:

$$\delta = -\beta - 2\theta \ldots \quad (3)$$

As the incidence α becomes smaller, the incidence β becomes larger. The smallest angle of incidence α is $-\pi/2$. So if sin α is −1 and if $$n \times \sin\delta < -1 \ldots \quad (4)$$

then, the rays of light incident on the prism plane 43 are all totally reflected, emitted from the plane 44 of the prism plate 40, scattered by the scattering plate and the like, and become rays of light that are incident again on the prism plate 40. When this inequality is transformed, $$\delta < \arcsin(-1/n) \ldots \quad (5)$$

Based on formulas (3) and (5), $$\beta > 2\theta + \arcsin(1/n) \ldots \quad (6)$$

Based on formulas (2) and (6), $$\theta > \frac{1}{2} \times (\pi/2 + \arcsin(1/n) - \alpha') \ldots \quad (7)$$

Moreover, $\alpha' = -\arcsin(1n)$ since sin α=−1

$$2\theta > \frac{2}{3}(\pi/2 + 2 \times \arcsin(1/n)) \ldots \quad (8)$$

Accordingly, in a prism plate whose prism vertex angle 2θ satisfies the above inequality (8), the totally reflected scattered light from the surface 42 is also totally reflected on the surface 43. And such prism plate makes it possible to prevent the light from being emitted in the ineffective range of visual angle that has been a problem inherent in the prior art, and further makes it possible to utilize the light that has hitherto been emitted to ineffective ranges of visual angle, as incident light that falls on the prism plate. This enables the light intensity within an effective range of visual angle to be increased substantially more than that of the prior art.

In the above explanation, the material around the prism plate is, for example, air or vacuum whose refractive index is 1. If the material around the prism plate is another material (for example, liquid such as oil or water, or transparent solid matter such as resin or glass) whose refractive index is n', the inequality (8) should be rewritten to inequality (9) as follows;

$$2\theta > \frac{2}{3}(\pi/2 + 2 \times \arcsin(n'/n)) \ldots \quad (9)$$

Because, when the light irradiated from a material 1 (whose refractive index is $n_1$) to a material 2 (whose refractive index is $n_2$), the relative refractive index $n_{21}$ is $n_2/n_1$. We can obtain formula (9) by rewriting "1/n" to "n'/n" in formula (8).

Next, described below is the operation of the liquid crystal indicator element of this embodiment. The light emitted from the cold cathode-ray tube 1 is incident on the side surface of the lightguide plate 3 directly or after-reflected from the reflector plate 2, reflected by the reflection member 4 applied to the lower side of the lightguide plate 3, and emitted from the upper side of the lightguide plate 3. The light emitted from the lightguide plate 3 is distributed through the scattering plate 5, and hence the light intensity is of a uniform distribution over a wide range of angles. The prism plate 6 utilizing the principles of the present invention emits light only within an effective range of visual angle, so that information is indicated through the liquid crystal indicator element 7.

Figure 3:
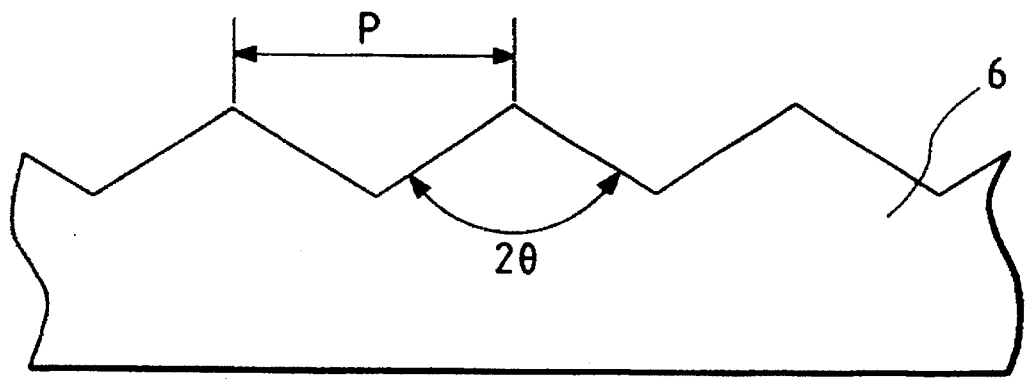
FIG. 3 is an enlarged sectional view which illustrates a prism plate embodying the present invention.

FIG. 3 is an enlarged sectional view of the prism plate 6. In this embodiment, the prism plate 6 is made of an acrylic resin and has a refractive index n of 1.585. By substituting the refractive index n=1.585 of the prism plate 6 for the right side of the inequality (8), $$\tfrac{2}{3}(\pi/2+2\times\arcsin(1/n))=112.2 \text{ degrees}$$

Therefore, the inequality (8) becomes, $$2\theta > 112.2 \text{ degrees}$$

Thus, the vertex $2\theta$ of the prism formed on the upper side is set to an angle which is greater than 112.2 degrees. For instance, 120 degrees (half vertex angle $\theta$ is 60 degrees) is desirable. Moreover, the pitch P of the prism is, for example, 50 μm. In FIGS. 1 to 3, the shapes of the prisms are shown in an exaggerated manner with respect to the thickness of the prism plate. The prism plate has a thickness of, for example, 1 min.

Figure 5:
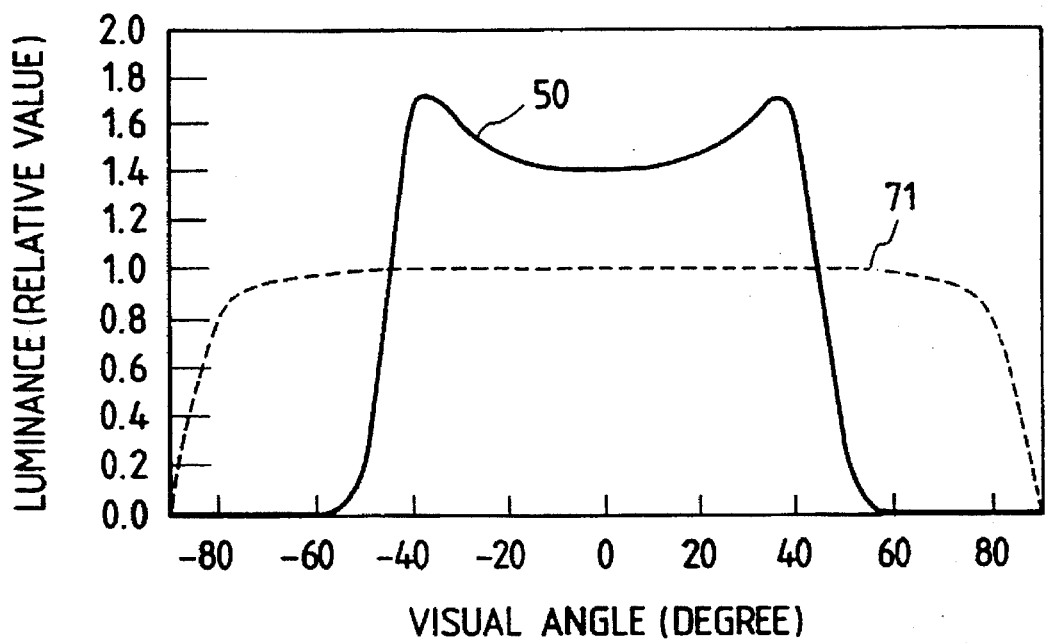
FIG. 5 shows the visual angle characteristic of the prism plate of the present invention.
Figure 6:
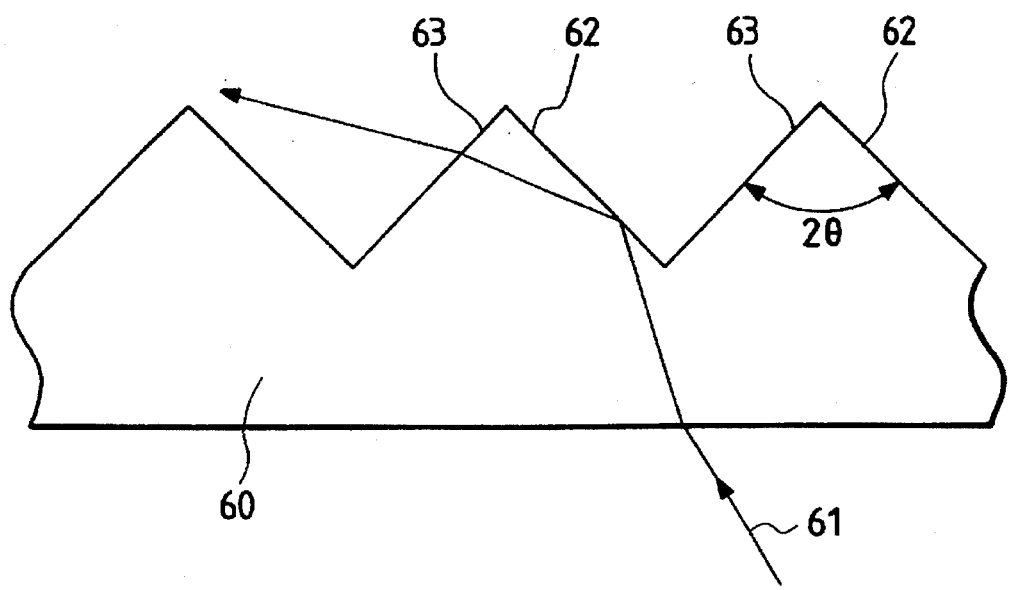
FIG. 6 is an enlarged sectional view which illustrates a conventional prism plate.
Figure 7:
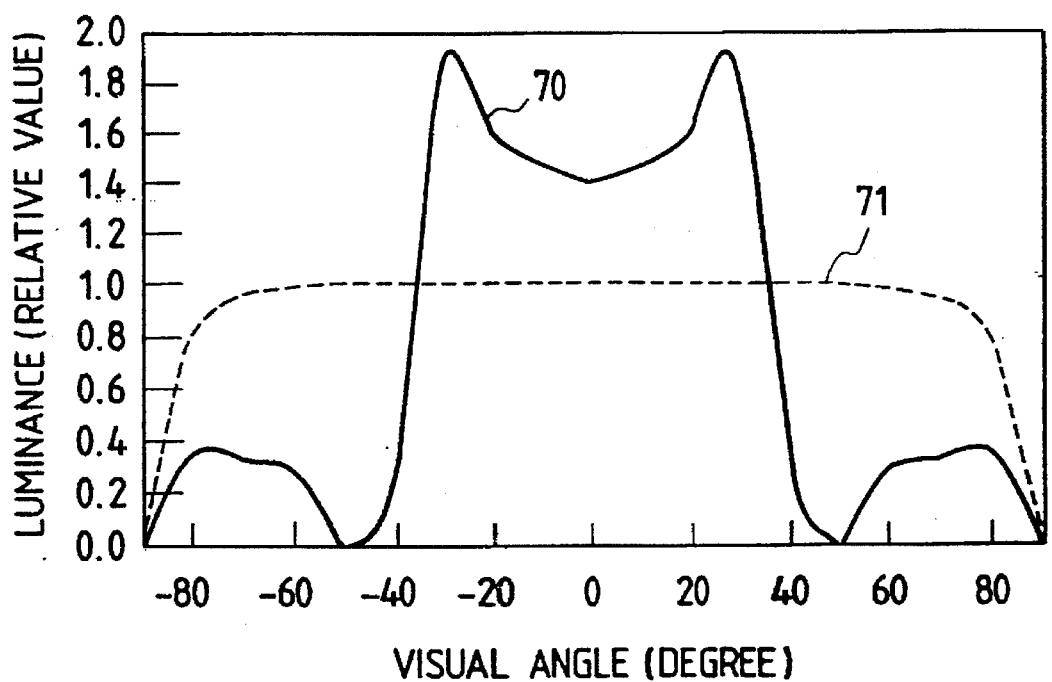
FIG. 7 shows the visual angle characteristic of the conventional prism plate of FIG. 6.

A solid line 50 of FIG. 5 represents the visual angle characteristic of the outgoing light of the prism plate 6 found by the ray trace calculation, similar to that of FIG. 7. Furthermore, a dotted line 71 corresponds to the visual angle characteristic of the scattering plate 5 as would occur when there is no prism plate 6, similar to that of FIG. 7, and shows a uniform distribution of light intensity over a wide range of angle of about +/–(plus/minus) 80 degrees. As shown by the solid line 50 in FIG. 5, no light is emitted over ineffective ranges of visual angle of smaller than –60 degrees and greater than 60 degrees, and the electric power is thus not wastefully consumed. Even when viewed from these directions, the indicator is not unnecessarily bright. Moreover, the effective range of visual angle is +/–45 degrees which is wider than the effective range of visual angle of +/–35 degrees as shown by the solid line 70 of FIG. 7, and the luminance is increased by more than 1.4 times.

Figure 8A:
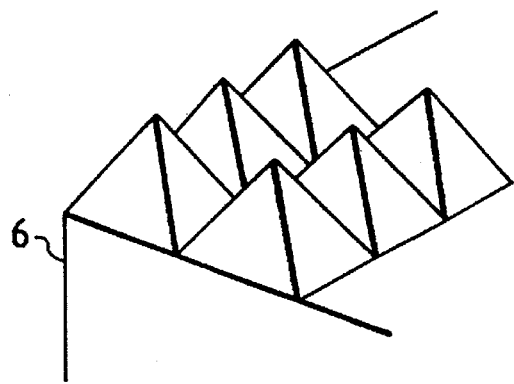
FIGS. 8 (a) and (b) are enlarged perspective views showing two protuberance structures at the surface of the prism plate of the type shown in FIGS. 3 and 4 in accordance with the present invention.
Figure 8B:
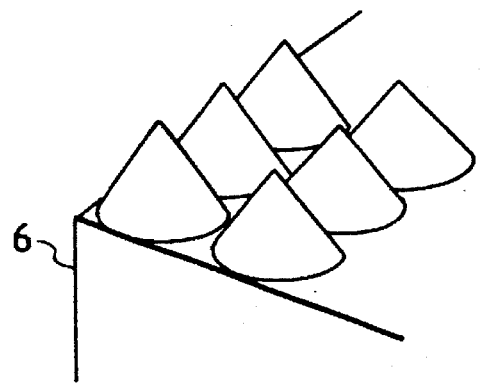

The present invention is in no way limited only to the above-described embodiment, and the prism plate need only have a refractive index and a vertex angle which satisfy the inequality (8). Furthermore, the prism plate is not limited to the one that has a prism shape only in one direction as shown in FIGS. 1 and 2, but can be those of a pyramid shape as shown in FIG. 8(a) or a conical shape having a prism shape in cross section in two directions, which is shown in FIG. 8(b). Moreover, the invention is not limited to the specific features shown in FIGS. 1 and 2, but can also include an embodiment in which the positions of the prism plate and the liquid crystal indicator element are exchanged. It is also within the scope of the present invention that the indicator can be a liquid crystal indicator of the back-light type as shown in FIGS. 1 and 2 of Japanese Patent Laid-Open No. 67016/1992.

In summary, the present invention provides an indicator which prevents light from being emitted into ineffective ranges of visual angle, increases the intensity of light emitted within an effective range of visual angle, has a small thickness and consumes a small amount of electric power, and hence is particularly suitable for use in a portable information processor, Although the invention has been ,described and illustrated in detail, it is to be clearly understood that the same is by way of illustration and example, and is not to be taken by way of limitation. The spirit and scope of the present invention are to be limited only by the terms of the appended claims.

I claim:

1. A prism plate constituting a medium with prism-like protuberance structure formed at a side thereof, wherein an angle $2\theta$ formed by the prism-like protuberance structure is defined by the formula, $$2\theta > \tfrac{2}{3} \times (\pi/2 + 2\times\arcsin(1/n))$$

where n is the refractive index of the prism plate medium.

2. A prism plate according to claim 1, wherein the medium is made of resin.

3. A prism plate according to claim 1, wherein the prism-like protuberance structure has a saw-tooth shape having a prism shape only in one direction.

4. A prism plate according to claim 1 wherein the prism-like protuberance structure has one of a pyramid shape and of a conical shape having a prism shape in cross section in at least two directions.

5. An information indicator comprising;

a light source, a scattering plate which scatters light from the light source, an indicator plate irradiated with scattered light from the scattering plate, and a prism plate operatively arranged with respect to the scattering plate and the indicator plate, and having a prism-like protuberance structure formed at a side, thereof, wherein the prism plate is so disposed that the prism-like protuberance structure faces the scattering plate, and the angle $2\theta$ constituting the prism-like protuberance structure is defined by the formula, $$2\theta > \tfrac{2}{3} \times (\pi/2 + 2\times\arcsin(n'/n))$$

where n is the refractive index of said prism plate medium, n' is the refractive index of a material in which the prism plate is arranged.

6. An information indicator according to claim 5, wherein the prism plate is located between the scattering plate and the indicator plate.

7. An information indicator comprising:

a light source, a scattering plate configured to scatter light from the light source, and a prism plate constituting a medium configured to refract the scattered light toward an indicator plate,, wherein a surface of the prism plate is configured to form a prism-like protuberance so that an angle $2\theta$ forming the prism like protuberance structure is defined by the formula, $$2\theta > \tfrac{2}{3} \times (\pi/2 + 2\times\arcsin(1/n))$$

where n is the refractive index of the prism plate medium.

8. Liquid crystal indicator apparatus comprising:

a liquid crystal plate for indicating information, a light guide plate being located at a lower surface of said liquid crystal plate, a light reflector being located at a lower surface of said light guide plate, a light source being located at a side surface of said light guide plate, a light scattering plate being located between said liquid crystal plate and said light guide plate, a light distribution control plate being located between said liquid crystal plate and said light scattering plate such that said light scattering plate is located between said light distribution control plate and said light guide plate.

9. A liquid crystal indicator apparatus according to claim 8, wherein said light reflector includes white paint painted at said lower surface of said light guide plate.

10. A liquid crystal indicator apparatus according to claim 8, wherein said light distribution control plate is a prism plate.

11. Liquid crystal indicator apparatus having a back light system comprising:

a liquid crystal plate for indicating information, and a back light system for supplying light to said liquid crystal plate, having a light guide plate located at a lower surface of said liquid crystal plate and having a light reflecting portion at a lower surface of said light guide plate, a line light source located at a side surface of said light guide plate to supply light to said light guide plate, a light scattering plate located between said liquid crystal plate and said light guide plate to scatter light irradiated from light guide plate, and an optical sheet being located between said liquid crystal plate and said light scattering plate such that said light scattering plate is located between said optical sheet and said light guide plate allows the optical sheet to emit scattered light within predetermined range of angles.

* * * * *